G. STINEBRING.
CLUTCH.
APPLICATION FILED JULY 22, 1912.
1,107,724.
Patented Aug. 18, 1914.
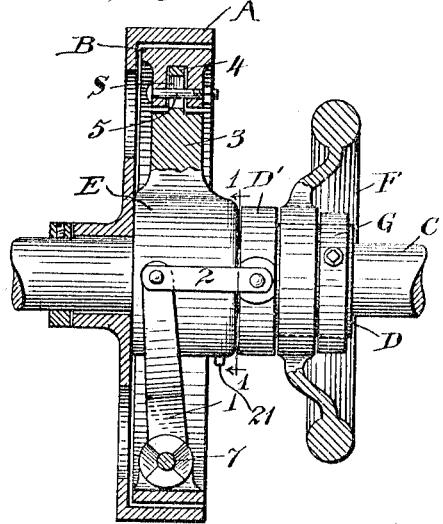
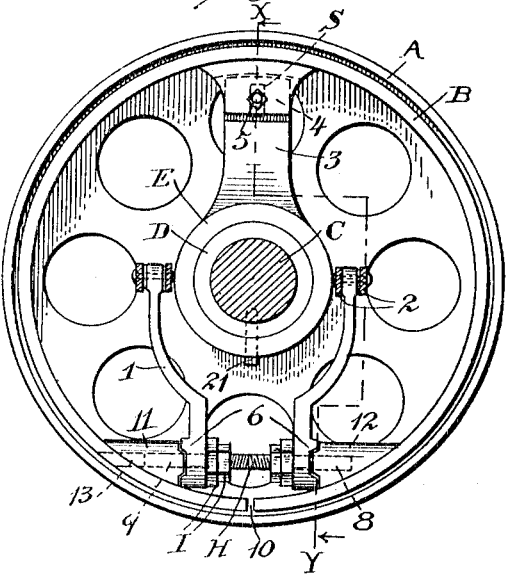
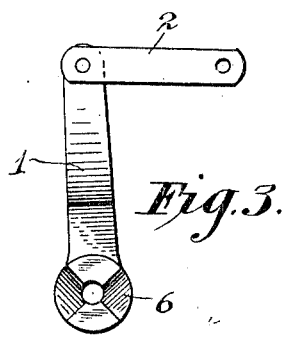
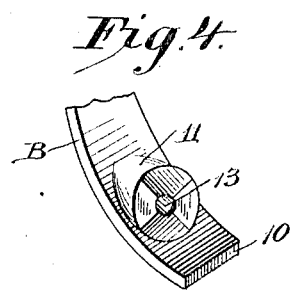
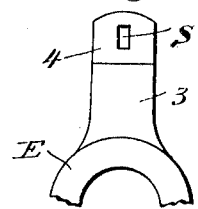
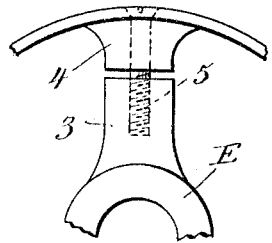
Witnesses.
W. E. Feeman
J. E. Applebaugh
Inventor:
George Stinebring
By Hiram B. Swartz
Atty.

UNITED STATES PATENT OFFICE.

GEORGE STINEBRING, OF WOOSTER, OHIO.

CLUTCH.

1,107,724.   Specification of Letters Patent.   Patented Aug. 18, 1914.

Application filed July 22, 1912. Serial No. 711,009.

*To all whom it may concern:*

Be it known that I, GEORGE STINEBRING, a citizen of the United States, residing at Wooster, in the county of Wayne and State of Ohio, have invented a new and useful Clutch, of which the following is a specification.

My invention relates to improvements in clutches, especially such as are used in connection with pulleys mounted loosely on a shaft. Its object is to provide an improved clutch, operable by hand, with or without the use of an intermediate lever, simpler and more powerful and requiring less room for its actuation than clutches of its class heretofore constructed; second, to provide improved means for its adjustment automatically within the pulley rim whereby at all parts of its periphery the clutch rim will exert equal pressure, and accommodate itself to the wear of the contacting parts; third, to provide means for applying force on opposite sides of the pulley shaft simultaneously to actuate the clutch, and fourth, to provide improved means for actuating the clutch and adjusting the spread of the split-ring to the inner surface of the pulley rim and for locking the same at any desired pressure.

It consists primarily of a split ring adjustably secured to a hub within a pulley rim and at a slight distance therefrom at all points of its periphery, said hub being solidly secured to a shaft adjacent to said pulley, which is loosely mounted on said shaft, and adjustably connected to said split ring at a point 180° from where it is cut apart, in the manner hereinafter set forth.

It further consists of the novel means I use for spreading the split ring comprising a pair of cam levers loosely mounted on a threaded bolt between opposite abutments, said levers operating on opposite sides of said pulley shaft, and adjustable between said abutments by means of lock-nuts on said bolt between said cam-levers, all as hereinafter more particularly described and claimed.

My invention is illustrated by the accompanying drawings in which similar letters and figures of reference indicate like parts.

Referring thereto, Figure 1 is a cross section view of my invention on line 1—1 of Fig. 2. Fig. 2 is a side view of the same on line X—Y of Fig. 1. Fig. 3 shows one of my cam-levers detached. Fig. 4 is a detail view of a part of the split ring. Fig. 5 is a view of my threaded bolt. Fig. 6 shows a part of the hub projection detached, and Fig. 7 is a modification of my hub connection with the split ring.

In the drawings, A is the rim of a pulley.

D is a sleeve which is slidably mounted on said shaft, and also adapted to rotate therewith by operative engagement of the pair of coupling bars 2 2 hereafter described. It has an enlarged portion D' adjacent the pulley for this purpose and for other purposes hereafter stated.

E is the hub of my improved clutch. It is solidly secured to the shaft C within the loose pulley rim A by a set screw 21 or other means, as shown in Fig. 2. Said hub has a radial projection 3 at one side which extends to a point a short distance inside of the split-ring B where it loosely engages a like projection 4 extending inwardly from the split ring B. Said projections stop short of each other to accommodate the expansion of said split-ring when the split apart ends thereof are actuated as hereafter set forth, and the radial projection 3 terminates with a tenon like end having an oblong hole or slot, as shown in Fig. 6, adapted to receive the bolt 5 which enters snugly the projection 4 transversely, as shown in Fig. 2, said projection being adapted to receive said tenon end of said radial projection 3 so as to move freely therein in a radial direction but not otherwise.

Heretofore means have been used which permit the expansion of the split ring into contact with the inner surface of the pulley rim at a point opposite the split, and such I do not broadly claim. My invention in this respect is limited to the novel means shown, comprising the two radial arms 3 and 4 extending from the ring and hub respectively and connected in a manner to permit their adjustment radially, only. I accomplish this by connecting the said projections 3 and 4 in such a manner as to permit the free action of both in a radial direction without any looseness in any other direction, and preferably by means of the separation of the parts, and the slot is cut in a radial direction as shown. At a point exactly opposite said radial connection the split-ring B is cut apart, at 10, and near each end thereof is an enlargement 11, 12, integral therewith. The adjacent ends of said enlargements are each constructed with a cam face thereon, as shown in Fig. 4, and perforated with a longitudinal bore 13, fitted to pivotally receive the end of the threaded bolt H, (Fig. 5) said bolt being fitted to rotate in said perforations at each end, 8, 9, the middle portion thereof being threaded at 7 to receive the lock nuts I. At points near the ends of said bolt H the lever arms 1 1 are respectively mounted, the enlarged heads thereof being provided with cam faces adapted to register with like cam faces on said enlargements 11 12 respectively as shown in Fig. 1, and said cam faces are held in juxtaposition against each other respectively by means of said lock-nuts I on said threaded bolt H, and also by the same means the pressure of said cams upon each other, and the amount of spread required to clutch the pulley rim may be easily adjusted to any desired tension and there locked by the mutual action of said cam faces upon each other, when operated by the cam levers 1 1 as hereafter stated. Said cam faces upon the heads of the lever arms 1 1 and upon the enlargements 11 12 are similar to each other, and each of said faces terminate with a flat portion so that when said heads are rotated about a quarter revolution upon said enlargements respectively said flat portions lie opposite and upon each other thereby constituting dead points which serve to hold said lever arms from returning automatically to a disengaged position. Said lever arms extend inwardly on opposite sides of the shaft C, and their free ends are linked to said sleeve enlargement D' by coupling bars 2 2 on opposite sides thereof, pivotally attached thereto as shown in Fig. 2. The sleeve D is actuated longitudinally upon the shaft C by means of the hand wheel F loosely mounted on the sleeve and secured in position by the collar G. Other means may be used to actuate said sleeve in either direction longitudinally, if desired.

The operation of the parts is as follows: Said cam-levers 1 1 being pivotally mounted on said bolt H as aforesaid, and their adjustment to the desired tension being fixed by said lock-nuts I on said threaded part 7 as shown in Fig. 1, said bolt will freely rotate in said opposite abutments, as well as within the heads of said levers. The movement of said sleeve D along the shaft C in a direction away from the pulley a short distance will simultaneously actuate both of said cam levers 1 1 upon the axis of said bolt H, and thereby rotate their respective cam faces upon and over the cam faces of said abutments 11 12, to the dead points thereof; and, at the same time the pressure of the spread apart ends of the split ring B against the inner surface of the pulley rim A will force the opposite side of the split ring, by the free movement of the said radial members 3 and 4 because of said extensible connection and the slot S, snugly against said rim surface, and thereby the entire peripheries of both split ring and pulley rim will be uniformly engaged, and, by properly adjusting the nut locks I the clutch may be locked at any desired tension as aforesaid.

I am aware it is not new to provide a split ring within a pulley, and spread apart the same by means of a cam lever operating between abutments, and such I do not broadly claim. My improvement in this respect lies in the use of a pair of cam levers arranged on opposite sides of the pulley shaft, and adjustable between abutments by means of a threaded bolt having its ends fitted to rotate therein respectively, and said pair of levers, having cam faces, mounted to pivot on said bolt between said abutments, and a pair of lock nuts on the middle and threaded part of said bolt between said cams to adjustably secure the same against cam faces on said abutments at any desired tension, and improved means for accomplishing the free play of the split ring either toward or away from the pulley rim in all radial directions, whereby the entire surface of the split ring is brought into immediate contact with every part of the under surface of the pulley rim, and like pressure exerted at all points simultaneously and there locked, or such pressure relaxed at pleasure. Said cam levers operate in all respects alike on opposite sides of the pulley shaft and thereby assist in keeping the pulley at a balance, give more room for the leverage required, and act equably and powerfully in actuating the clutch, and the adjusting means aforesaid are more simple and inexpensive than heretofore, and the capacity of the clutch, by the aforesaid uniform and universal pressure adjustment, is greatly enlarged.

Having thus fully described my invention, what I claim as new and desire to secure by Letters Patent is—

1. In a clutch, the combination with a shaft, a hollow loose pulley mounted thereon, a hub secured to said shaft within said pulley independently thereof, an arm extending from said hub in a radial direction within said pulley, an expansible split ring encircling said hub within said pulley, and means for adjustably connecting said ring to said hub arm at a point opposite the split of said ring, of a pair of abutments within said ring adjacent to said split, cam faces on said abutments respectively, set opposite each other thereon, and a longitudinal bore through said abutments, a threaded bolt rotatable upon its opposite ends in the bore of said abutments respectively, a pair of lever arms having cam faced enlargements pivotally mounted opposite each other on said threaded bolt adjacent said abutments respectively, each cam face terminating with a flat portion and adapted to register with a like cam face of its adjacent abutment, a pair of lock nuts on said threaded bolt operable between said enlargements, and means for actuating said pair of lever arms on opposite sides of said hub simultaneously, substantially as set forth.

2. In a clutch, the combination with a shaft, a loose pulley thereon, a hub secured to said shaft within the rim of said pulley independently thereof, a split ring encircling said hub within said pulley rim, and means for adjustably connecting said ring to said hub, of a pair of opposite abutments on said split rim having cam faces respectively, a bolt threaded intermediately its ends and rotatively mounted in and between said abutments, a pair of lever arms having cam faced enlargements respectively pivotally mounted on said bolt to coöperate with the cams on said abutments, and means for actuating said lever arms on opposite sides of said hub, substantially as set forth.

3. In a clutch, the combination with a shaft, a loose pulley mounted thereon, a hub extended within the rim of said pulley and secured to said shaft independently of said pulley, a radial arm projecting from said hub within said pulley rim, a split ring encircling said hub within said pulley rim, an arm projecting inwardly from said ring opposite the split thereof, means for adjustably connecting said radial arms longitudinally, a pair of opposite abutments within said ring adjacent to said split having cam faces respectively, terminating with a flat surface, a bolt threaded intermediately its ends and rotatively mounted in and between said abutments, a pair of lever arms pivoted on said bolt between said abutments having cam faces to coöperate therewith a pair of lock nuts operable on said bolt between said levers to adjustably secure the cam faces thereon against the cam faces of said opposite abutments, respectively, and means, including a sleeve movable on said shaft, to actuate said cam levers on opposite sides thereof, simultaneously, substantially as set forth.

4. In a clutch of the class described, comprising a split ring adjustably mounted on a hub within a loose pulley rim, the combination with a pair of opposite abutments on said split ring, having cam faces, of a bolt threaded intermediate its ends rotatably mounted in and between said abutments, a pair of levers having cam faces adjacent said abutments respectively to coöperate with the cam faces thereon, said levers pivotally mounted on said bolt between said abutments, and means for actuating said levers on opposite sides of said hub simultaneously, substantially as set forth, and for the purpose specified.

In witness whereof, I hereunto set my hand this 8 day of June, 1912.

GEORGE STINEBRING.

In presence of two witnesses:
FRANK TAGGART,
HIRAM B. SWARTZ.

Copies of this patent may be obtained for five cents each, by addressing the "Commissioner of Patents, Washington, D. C."